(12) United States Patent
Yamaoka

(10) Patent No.: US 7,685,458 B2
(45) Date of Patent: Mar. 23, 2010

(54) ASSIGNED TASK INFORMATION BASED VARIABLE PHASE DELAYED CLOCK SIGNALS TO PROCESSOR CORES TO REDUCE DI/DT

(75) Inventor: Hiroaki Yamaoka, Austin, TX (US)

(73) Assignee: Kabushiki Kaisha Toshiba, Tokyo (JP)

( * ) Notice: Subject to any disclaimer, the term of this patent is extended or adjusted under 35 U.S.C. 154(b) by 191 days.

(21) Appl. No.: 11/609,794

(22) Filed: Dec. 12, 2006

(65) Prior Publication Data
US 2008/0141062 A1    Jun. 12, 2008

(51) Int. Cl.
*G06F 1/06* (2006.01)
(52) U.S. Cl. ...................... 713/501; 713/401
(58) Field of Classification Search .............. None
See application file for complete search history.

(56) References Cited

U.S. PATENT DOCUMENTS

| | | | |
|---|---|---|---|
| 5,086,500 A * | 2/1992 | Greub | 713/401 |
| 6,931,506 B2 * | 8/2005 | Audrain | 711/169 |
| 6,943,610 B2 * | 9/2005 | Saint-Laurent | 327/295 |
| 6,983,387 B2 | 1/2006 | Boerstler et al. | 713/322 |
| 7,017,064 B2 * | 3/2006 | Thomas et al. | 713/400 |
| 2002/0157032 A1 * | 10/2002 | Jensen et al. | 713/500 |
| 2005/0030275 A1 * | 2/2005 | Kwon | 345/100 |
| 2007/0283128 A1 * | 12/2007 | Hoshaku | 712/1 |

* cited by examiner

*Primary Examiner*—Kenneth S Kim
(74) *Attorney, Agent, or Firm*—Law Offices of Mark L. Berrier

(57) ABSTRACT

Systems and methods for managing power consumption in an integrated circuit to reduce the rate of change of current (di/dt) in the integrated circuit. One embodiment comprises a system having multiple processor cores. A timing system provides each of the processor cores with a corresponding operating clock signal. The timing system uses variable delay elements to impart variable delays to the clock signals. A delay management unit determines the delays that should be used by the task processing units in executing their assigned tasks and provides this information to the variable delay elements to set the appropriate delays in each of these elements. The delay information is also provided to a task management unit, which assigns the tasks to specific processor cores based upon the delays selected by the delay management unit, so that consecutively fired processor cores are not adjacent to each other.

7 Claims, 9 Drawing Sheets

ASSIGNED TASK INFORMATION BASED VARIABLE PHASE DELAYED CLOCK SIGNALS TO PROCESSOR CORES TO REDUCE DI/DT

BACKGROUND

1. Field of the Invention

The invention relates generally to systems and methods for managing power consumption by components in an electronic device, and more particularly to systems and methods for improving power usage characteristics such as the rate of change of current (di/dt) in integrated circuits such as microprocessors.

2. Related Art

When integrated circuits such as processors are operated, they draw current from a power source. The logic components within an integrated circuit typically operate based on a clock signal, so the current drawn by the integrated circuit may suddenly increase at certain points in the clock cycle (e.g. at the rising edge of each clock cycle.) The high rate of change of the current (high di/dt) may cause electromagnetic interference (EMI) and/or noise in the power supply. Both EMI and power supply noise are undesirable.

Reducing EMI and power supply noise is becoming more and more important in designing electronic systems. This is true for a number of reasons. For instance, because it is desirable to increase the number of operations that can be performed by processors in a given amount of time, clock frequencies are increasing. The increased clock frequencies make the processors more susceptible to EMI and power supply noise. It is also desirable to design integrated circuits to use less power, so power supply voltages are decreasing. These decreased power supply voltages also make the integrated circuits more susceptible to EMI and power supply noise. Still further, because it is desirable to increase computational power, processors may include multiple processor cores, each of which contributes to di/dt and thereby creates more noise and EMI.

In some conventional multiprocessor systems, tasks are performed on the system's processor cores without consideration of di/dt. FIG. 1A illustrates a multiprocessor system in which a single clocking signal (system clock signal, CLK1) is provided to all of the system's processor cores. In some other conventional multiprocessor systems, di/dt is reduced by operating different processor cores with incrementally delayed clock signals. The switching noise and di/dt contributions associated with each processor core are distributed over a clock cycle using this method. A system of this type is illustrated in FIG. 1B. The clock signals provided to the processor cores are shown in FIG. 1C.

While the use of incrementally delayed clock signals for the different processor cores does reduce di/dt to some extent, it would be desirable to provide systems and methods for further reducing di/dt in integrated circuits generally, and in multiprocessor systems in particular.

SUMMARY OF THE INVENTION

One or more of the problems outlined above may be solved by the various embodiments of the invention. Broadly speaking, the invention includes systems and methods for managing power consumption in an integrated circuit to reduce the rate of change of current (di/dt) in the integrated circuit.

One embodiment comprises a system having multiple task processing units (e.g., processor cores) configured to perform assigned tasks. A timing system coupled to the task processing units is configured to provide each of the task processing units with a corresponding operating clock signal. The timing system is configured to impart variable delays to one or more of the clock signals, so that the clock signals can be phase shifted with respect to each other. In one embodiment, the timing system uses variable delay elements which are configured to receive a system clock signal and to delay the clock signal by a selected amount before providing the signal to a corresponding one of the task processing units. The delay elements may be configured to provide continuous or discrete, selectable delays. In one embodiment, a task management unit and a delay management unit are implemented in the system. The task management unit determines which tasks are to be executed by the task processing units, while the delay management unit determines the delays that should be used by the task processing units in executing their assigned tasks. The delay management unit may, for example, determine the desired delays by looking up the set of assigned tasks in a look-up table. The task management unit may be configured to assign the tasks to specific task processing units based upon the delays selected by the delay management unit, so that consecutively fired task processing units are not adjacent to each other.

Another embodiment comprises a method for executing tasks on a set of task processing units, such as processor cores. The method comprises identifying a set of tasks to be executed, determining a set of delays associated with the identified tasks, and delaying clock signals provided to the task processing units so that the identified tasks will be executed with corresponding phase shifts. The amounts by which the clock signals are delayed are variable, and are dependent upon the particular tasks selected to be executed. The clock signals may be delayed, for example, by delaying a system clock signal by a selected amount before providing the signal to a corresponding task processing unit. The amount of the delay may be selected by routing the system clock signal through one of a set of signal paths, each of which causes a different delay in the signal. Alternatively, a single signal path incorporating a discretely or continuously variable delay element may be used. The amount by which the different clock signals are delayed may, for instance, be determined by looking up an entry corresponding to the identified set of tasks in a look-up table, and reading an associated set of delays from the entry. The tasks may further be assigned to specific task processing units based upon the delays selected by the delay management unit, so that consecutively fired task processing units are not adjacent to each other.

Another embodiment comprises a system having multiple task processing units, such as processor cores, configured to perform assigned tasks. A timing system coupled to the task processing units is configured to provide each of the task processing units with a corresponding operating clock signal. The timing system is configured to impart delays to one or more of the clock signals, so that when the clock signals are ordered according to the magnitudes of the corresponding delays, consecutive clock signals are provided to non-adjacent task processing units. In one embodiment, the system includes a task management unit configured to determine a set of tasks to be performed, receive information indicating the associated clock signal delays, and assign each task to one of the task processing units so that consecutively fired task processing units are not adjacent. The system may also include a delay management unit configured to receive task information and to determine desired delays for each of the operating clock signals based on the task information. The delay management unit may be configured to determine the delays by looking up appropriate entries in a look-up table.

Yet another embodiment comprises a method for executing tasks on a set of task processing units (e.g., processor cores) including identifying a set of tasks to be executed, determining a set of operating clock signal delays associated with the identified tasks, and assigning the tasks to task processing units so that consecutively fired task processing units are not adjacent. The method may include determining desired delays for each of the operating clock signals based on identification of the tasks to be executed. This may be done, for example, by looking up appropriate entries in a look-up table.

Numerous additional embodiments are also possible.

BRIEF DESCRIPTION OF THE DRAWINGS

Other objects and advantages of the invention may become apparent upon reading the following detailed description and upon reference to the accompanying drawings.

Figure 1A:
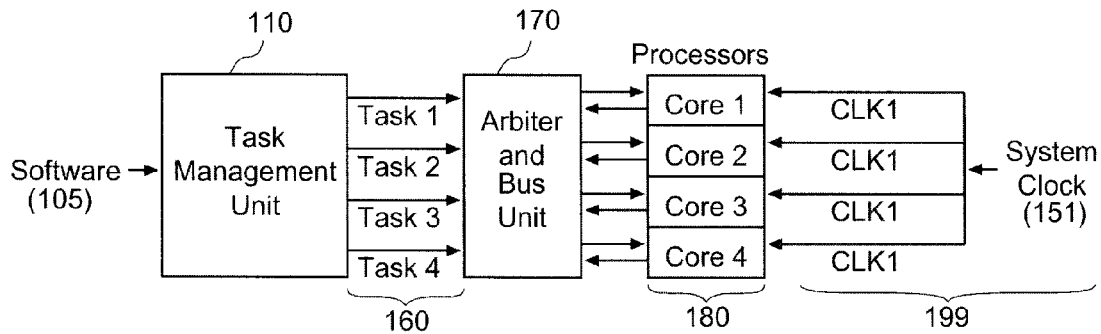
FIG. 1A is a functional block diagram illustrating a system in accordance with the prior art.

While the invention is subject to various modifications and alternative forms, specific embodiments thereof are shown by way of example in the drawings and the accompanying detailed description. It should be understood that the drawings and detailed description are not intended to limit the invention to the particular embodiments which are described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

Broadly speaking, the invention includes systems and methods for managing power consumption by components in an electronic device, and more particularly to systems and methods for improving power usage characteristics such as the change in current (di/dt) in integrated circuits such as microprocessors.

One embodiment comprises a multiprocessor system. The system has multiple (e.g., 4) processor cores for executing tasks that are defined by the software being run on the system. A task management unit receives the software instructions and identifies a set of tasks to be executed by the processor cores. The task management unit also determines which of the tasks should be assigned to which of the processor cores. This is repeated for successive sets of tasks embodied in the software.

A timing system provides clock signals to the processor cores to drive their operation. The clock signal provided to each processor core is delayed, or phase-shifted, with respect to the clock signals for the other cores in order to avoid the rising (and falling) edges of the clock signals being coincident. This reduces the rate of change of current (di/dt) in the system. Rather than having fixed delays for the different clock signals, however, the delays are variable. This allows the respective delays to be optimized according to the tasks (e.g., so that power usage peaks associated with the tasks do not overlap) thereby reducing di/dt.

In this embodiment, the task management unit provides information indicating which tasks are to be executed to a delay management unit. The delay management unit determines, based on the identified tasks, a set of delays for the processor cores' clock signals that will cause the level of di/dt to be minimized. The delay management unit determines the delays in this embodiment by identifying an entry in a look-up table corresponding to the selected set of tasks, and reading an associated set of delays from the identified entry.

The delays determined by the delay management unit to be appropriate are provided to the timing system, which uses this information to set the delays for each clock signal. In this embodiment, the delays are set by providing the information from the delay management unit as control inputs to delay elements for each of the processor cores. The control inputs set the delays of the respective delay elements, which then delay the corresponding clock signals according to the control inputs.

In this embodiment, the identified delay information is also provided to the task management unit and to an arbitrated bus unit. The task management unit assigns the tasks to specific task processing units based upon the delays selected by the delay management unit, so that consecutively fired task processing units are not adjacent to each other. The bus unit uses the delay information to facilitate transfer of the program instructions corresponding to the tasks to the processor cores.

Various embodiments of the invention will be described below. Primarily, these embodiments will focus on the use of delay elements set with appropriate delays to introduce varying amounts of latency to the execution of a number of processor cores. The embodiments will also illustrate the distribution of tasks amongst a number of processor cores.

Before describing the exemplary embodiments of the invention, it may be helpful to describe an exemplary prior art multiprocessor system and the conventional means for reducing di/dt in the system. Referring to FIG. 1A, the structure of a typical prior art multiprocessor is shown. The system includes four processor cores 180. A task management unit 110 is used to identify the tasks required by software 105, and to determine how the tasks will be allocated to each of the processor cores. When task management unit 110 has determined which of the processor cores will execute a particular task, the task (see 160) is conveyed from the task management unit to the processor core via bus unit 170. This is repeated for the various tasks so that each is assigned to a processor core for execution.

It can be seen in the figure that each of processor cores 180 receives a clock signal from a timing system 199. In this embodiment, timing system 199 distributes a single clock signal (CLK) from a system clock 151 to each of processor cores 180. Consequently, each processor core 180 executes the instructions corresponding to its assigned task synchronously with the other processor cores. As noted above, the synchronization of the processor cores can cause relatively high di/dt and EMI.

Figure 1B:
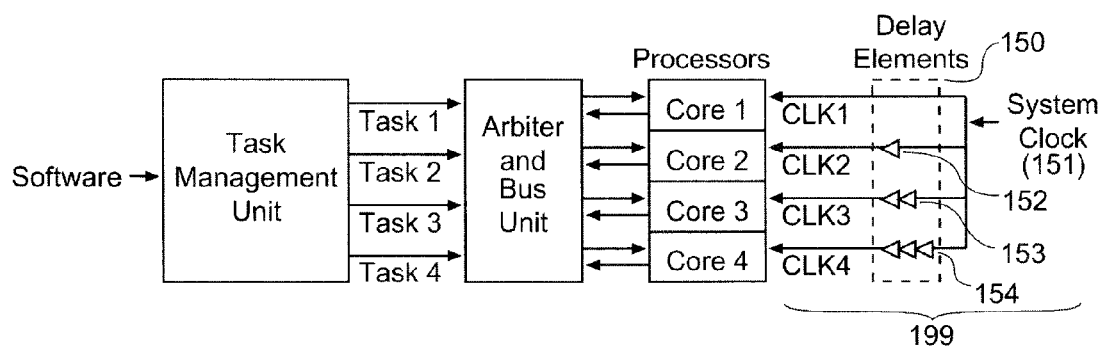
FIG. 1B is a functional block diagram illustrating a system incorporating fixed delay elements in accordance with the prior art.

Referring to FIG. 1B, the structure of a second prior art multiprocessor is shown. This system again includes four processor cores 180, a task management unit 110 and a bus unit 170 configured generally as described above in connection with FIG. 1A. The difference between this system and the system of FIG. 1A is that, rather than providing a single clock signal synchronously to each of processor cores 180, timing system 190 incrementally delays each of the clock signals so that the clock signal provided to each processor core is phase-shifted from the clock signals provided to the other processor cores.

Figure 1C:
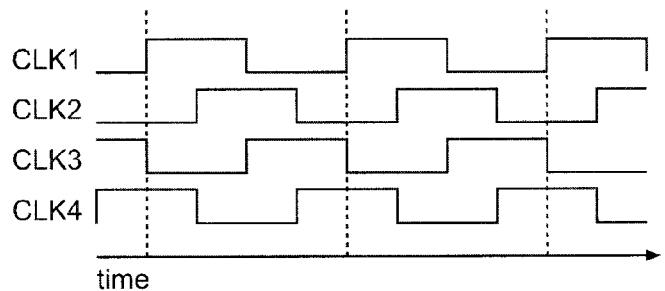
FIG. 1C is an exemplary timing diagram associated with a system in accordance with the prior art.

This is accomplished by placing delay elements in the signal paths between system clock 151 and the respective processor cores 180. As depicted in FIG. 1B, the signal from system clock 151 (CLK1) is provided directly to core 1 (i.e., no delay elements are present in the signal path between the system clock and the processor core.) Delay element 152 is placed in the signal path between the system clock and core 2 in order to delay the clock signal with respect to CLK1. The resulting delayed signal is shown as CLK2. Similarly, delay elements 153 and 154 are placed in the signal paths between the system clock and cores 3 and 4 to produce CLK3 and CLK4, respectively. The delay elements as depicted consist of simple buffers (e.g., inverter pairs.) The delay of CLK3 with respect to CLK1 is twice that of CLK2, and the delay of CLK4 with respect to CLK1 is three times that of CLK2. Thus, the four clock signals provided to the processor cores are evenly phase shifted (i.e., successive clock signals are shifted by one fourth of a clock cycle) as shown in FIG. 1C. This reduces di/dt and noise, as compared to the system of FIG. 1A.

Figure 2:
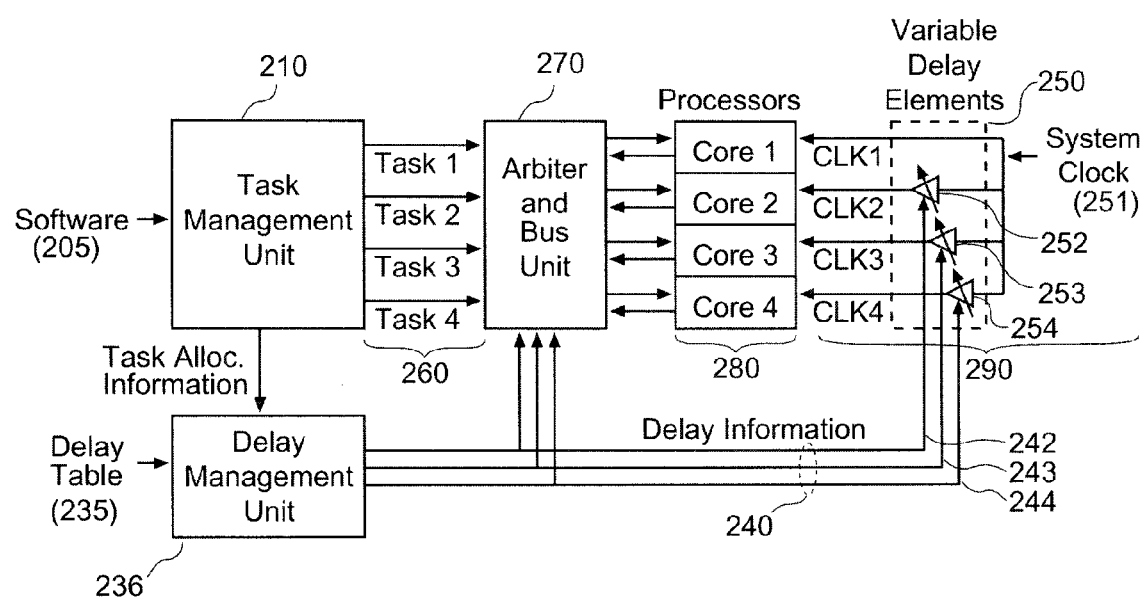
FIG. 2 is a functional block diagram illustrating a system configured with a delay management unit and variable delay elements in accordance with one embodiment.

Referring to FIG. 2, the structure of a multiprocessor system in accordance with an exemplary embodiment of the invention is shown. In this embodiment, four processor cores 280 are provided for execution of the instructions of software 205. The multiprocessor system of FIG. 2 includes a task management unit 210, which is configured to receive the instructions of software 205, identify different tasks within these instructions, and assign each of the tasks to one of processors 280 for execution. After task management unit 210 has determined which processor core will execute a particular task, the task is conveyed to an arbitrated bus unit 270, which in turn conveys the task to the assigned processor core.

It can be seen in FIG. 2 that timing system 290 provides a clock signal to each of processor cores 280. Similar to timing system 190 in FIG. 1B, the clock signals provided to each of processor cores 2, 3, and 4 are delayed, or phase shifted, with respect to the system clock, CLK1. (The delayed clock signals may be referred to herein as operating clock signals.) In contrast to timing system 190, however, timing system 290 delays each of the clock signals by an amount that is variable. In other words, the amount by which each clock signal is delayed can be changed from one task to the next. In the prior art system of FIG. 1B, on the other hand, the relative delays between the clock signals of the different processor cores never change—CLK4 always lags ¼ cycle behind CLK3, which always lags ¼ cycle behind CLK2, which always lags ¼ cycle behind CLK1.

Figure 3:
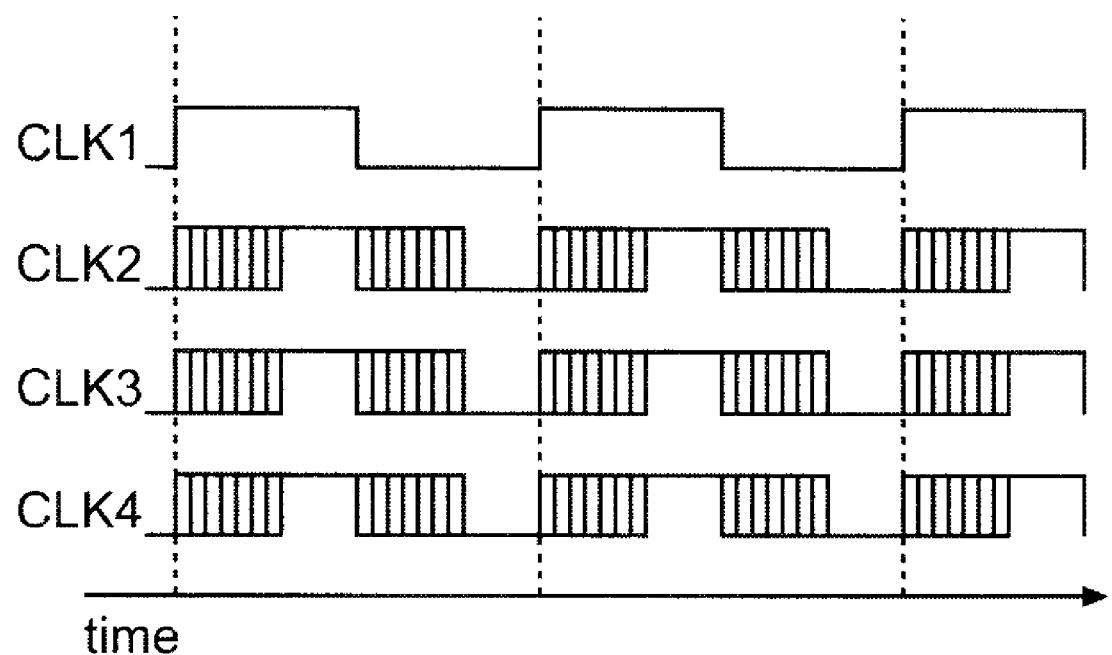
FIG. 3 is a timing diagram illustrating the variability of the delay imparted to clock signals in accordance with one embodiment.
Figure 4:
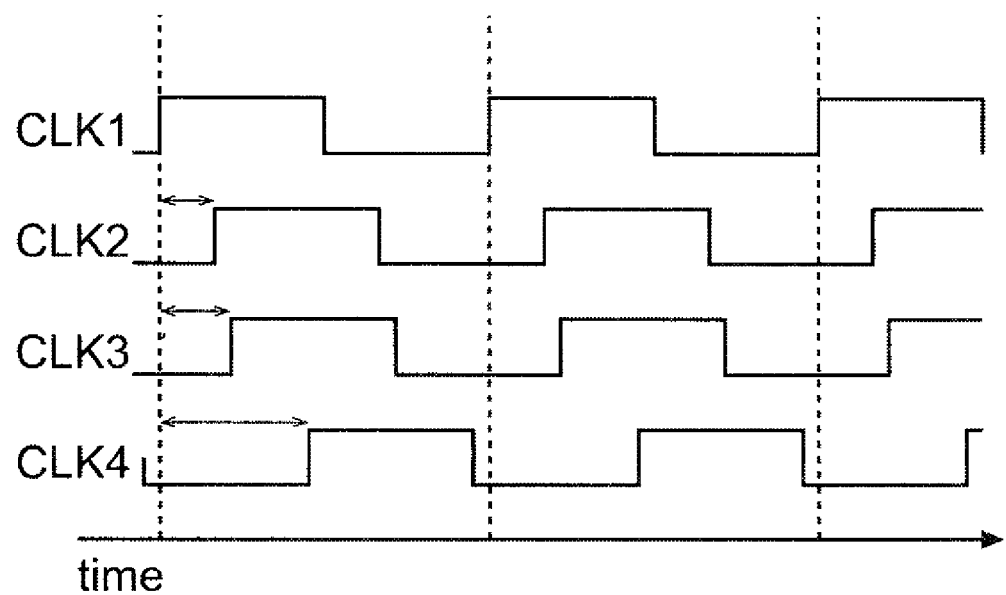
FIG. 4 is a timing diagram illustrating an exemplary particular set of timing delays that may be imparted to clock signals for execution of a corresponding set of tasks in acxc with one embodiment.

The clock signals provided to the processor cores by timing system 290 are illustrated in FIGS. 3 and 4. FIG. 3 is a timing diagram illustrating the variability of the delay imparted to each of the clock signals. FIG. 4 is a timing diagram illustrating one particular set of timing delays that may be imparted to the clock signals to reduce di/dt for a corresponding set of tasks that are to be executed by the processor cores.

Referring to FIG. 3, clock signals CLK1, CLK2, CLK3 and CLK4 are depicted. CLK1 is the system clock signal which, in this embodiment, is provided directly to processor core 1 without being delayed. Each of clock signals CLK2, CLK3 and CLK4 is delayed by some amount with respect to CLK1. The amount of each delay is variable. This is indicated by the multiple vertical lines at the rising and falling edges of each of clock signals CLK2, CLK3 and CLK4. It should be noted that the vertical lines indicating the potential delay are spaced across approximately ¼ of a clock cycle for purposes of clarity—each of the clock signals may be delayed by up to a full clock cycle.

Referring to FIG. 4, clock signals CLK1, CLK2, CLK3 and CLK4 are again depicted. In this figure, however, a particular delay has been set for each of clock signals CLK2, CLK3 and CLK4 with respect to clock signal CLK1. It can be seen that CLK2 is delayed by approximately ⅙ of a cycle, CLK3 is delayed by approximately ¼ of a cycle, and CLK4 is delayed by approximately ½ of a cycle. These delays are used while the processor cores execute a corresponding set of tasks. When a different set of tasks are executed, a different set of delays may be used. The delays may be discretely or continuously variable, depending upon the implementation of a particular embodiment, and need not have any particular order (e.g., increasing with the processor core number.)

Referring again to FIG. 2, the clock signals provided to each of processor cores 2, 3, and 4 are delayed by variable delay elements 252-254, which are located in the signal paths between system clock 251 and the respective processor cores. Each of delay elements 252-254 receives a control signal via a corresponding one of control lines 242-244. The control signal input to each delay element determines the magnitude of the delay that is imparted to the corresponding clock signal. In the embodiment of FIG. 2, the control signals are also provided to bus unit 270 so that the bus unit can synchronize the transfer of instructions to each processor core according to the corresponding delayed clock signal.

Figure 5:
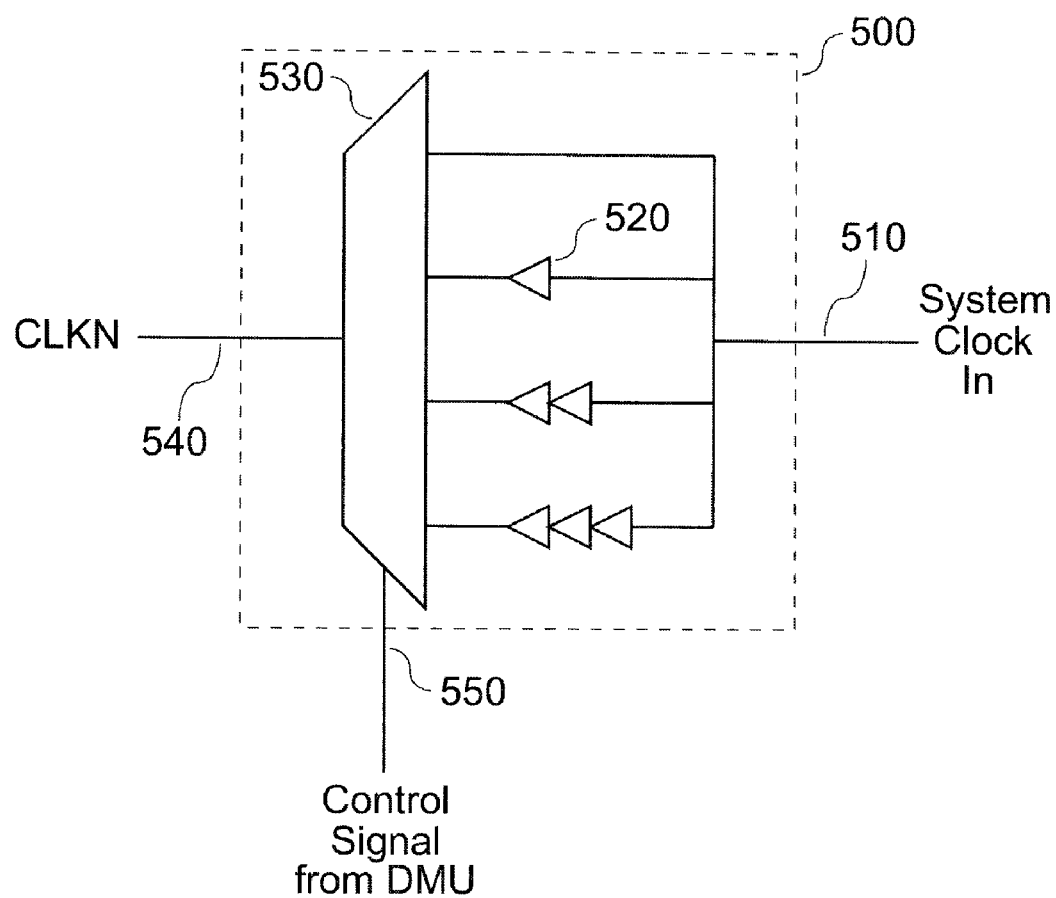
FIG. 5 is a diagram illustrating the structure of a discretely variable delay element in accordance with one embodiment.

Referring to FIG. 5, a diagram illustrating the structure of a discretely variable delay element in accordance with one embodiment is shown. It should be noted that the delay element depicted in this figure is just one of many possible structures which could be used to implement this component of the system. As shown in this figure, delay element 500 includes a multiplexer 530 and a plurality of buffers (e.g., 520.) A system clock signal (CLK1) is input to delay element 500 on line 510. This clock signal is provided to each of the inputs to multiplexer 530, but is delayed by a different amount at each of these inputs. For example, CLK1 is provided to the first (uppermost) input of multiplexer 530 without any delay, but the signal is delayed by propagating it through a buffer (520) before it is provided to the second input. The clock signal is delayed by incrementally greater amounts at successive inputs to multiplexer 530 by propagating the signal through increasing numbers of buffers. Thus, the system clock signal is provided to the inputs of multiplexer 530 with 0, 1, 2 and 3 times the delay caused by propagating signal through a single buffer. Consequently, the signal output by delay element 500 at line 540 is delayed by 0, 1, 2 or 3 times the delay of a single buffer. It should be noted that the delay element depicted in this figure is just one of many possible structures which could be used to implement this component of the system, and other implementations could have more or fewer selectable delays, continuously variable delays, or other features which are different than those described here.

In the embodiment of FIG. 2, the control signals for delay elements 252-254 are generated by a delay management unit 236. Delay management unit 236 is coupled to task management unit 210, and is configured to receive information identifying the tasks that have been selected for execution by processor cores 280. Delay management unit 236 uses the task information from task management unit 210 to determine the delays that will be used by each of processor cores 280.

Delay management unit 236 may select the delays for the clock signals in a variety of ways, such as by computing the delays based upon the identified tasks. In one embodiment, a look-up table is generated and stored in the delay management unit so that the delay management unit can simply select a set of delays (one for each of the processor cores) corresponding to the tasks that have been selected by the task management unit. Each set of delays may, for example, be empirically determined in a laboratory environment. In this case, a user may select a set of tasks to execute on a set of processor cores, then execute the tasks using different combinations of delays for the processor cores' respective clock signals. When an optimal set of delays is determined, the set of delays is stored in an entry of the look-up table corresponding to the selected set of tasks. This process is repeated for each possible set of tasks. Thus, for a set of tasks A, B, C and D, the delay management unit can look up the corresponding set of delays in the look-up table.

Figure 6:
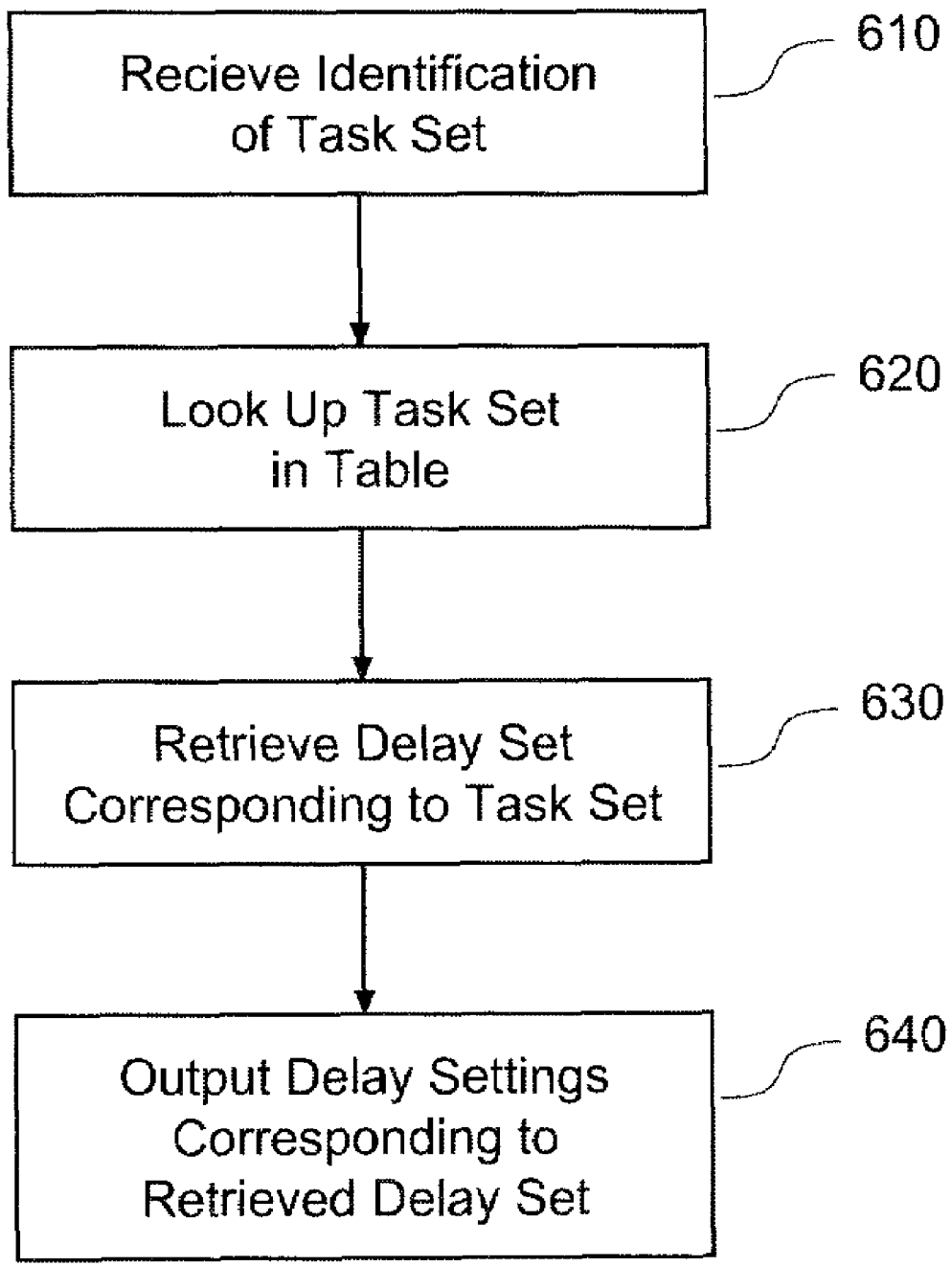
FIG. 6 is a flow diagram illustrating operation of a delay management unit in acc with one embodiment.

The operation of the delay management unit in this embodiment can therefore be illustrated by the flow diagram of FIG. 6. As depicted in this figure, the delay management unit receives information identifying a set of tasks to be executed by the processor cores (610.) The delay management unit then looks up the identified set of tasks in the look-up table (620.) The delay management unit then retrieves the set of delays in the entry for the identified set of tasks (630.) The retrieved set of delays are then output by the delay management unit to the appropriate delay elements in the timing system so that the clock signal provided to each processor core has the appropriate delay.

Figure 7:
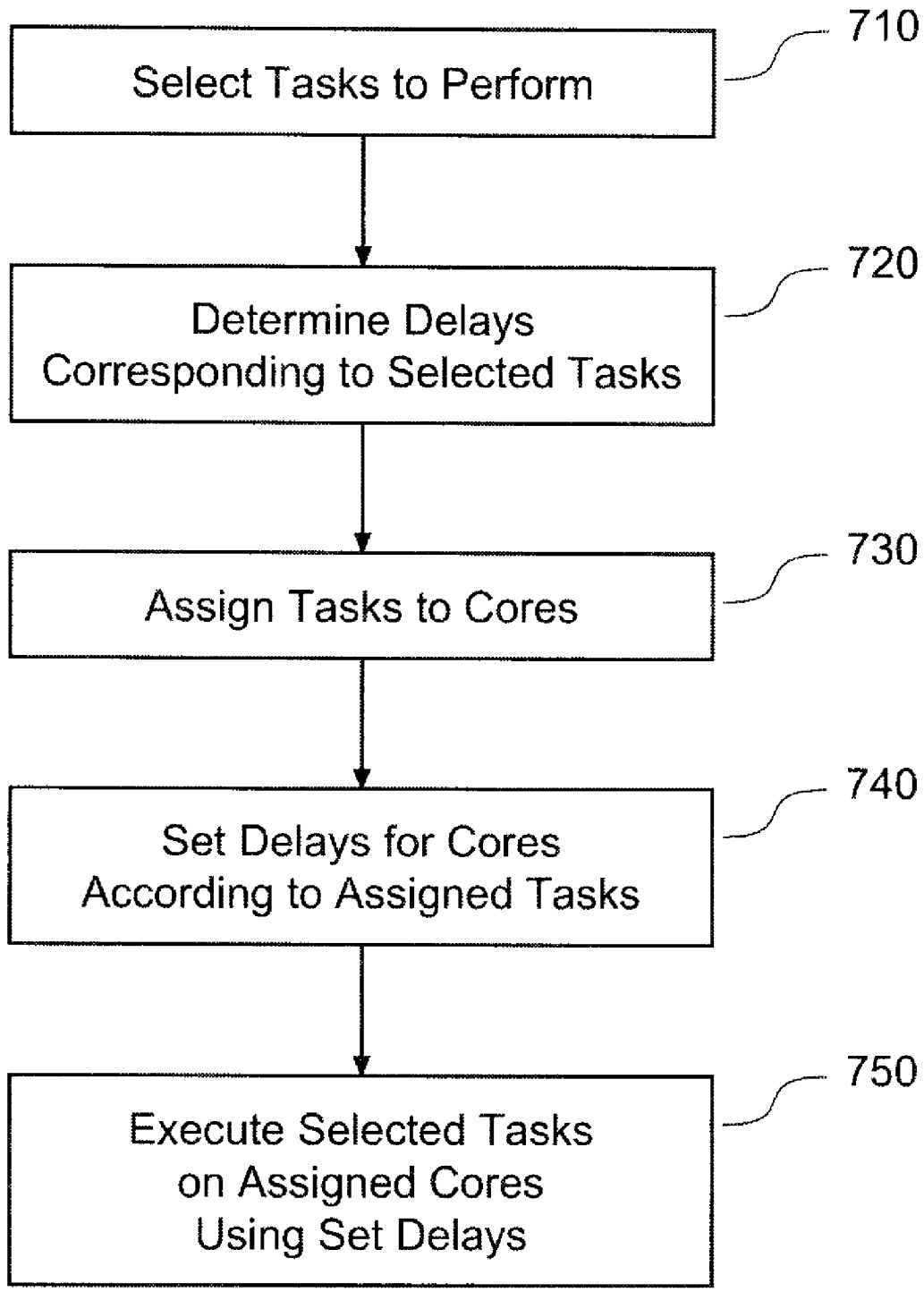
FIG. 7 is a flow diagram illustrating the overall operation of a multiprocessor system in accordance with one embodiment.

The overall operation of the multiprocessor system can therefore be illustrated by the flow diagram of FIG. 7. As depicted in this figure, the task management unit first selects the tasks that are to be performed by each processor core (710.) Information identifying the selected set of tasks is then provided to the delay management unit, which determines the set of delays corresponding to the selected tasks (720.) The task management unit then assigns the tasks to the different processor cores (730,) while the delay management unit sets the clock signal delays for each of the processor cores (740.) Finally, the processor cores execute the assigned tasks using the clock signals, delayed according to the control signals from the delay management unit (750.)

It should be noted that the determination of clock delays to be used in the execution of particular tasks by the processor cores can be accomplished with varying granularities in different embodiments. In other words, the delays can be determined for individual tasks, for sub-tasks, for groups of tasks, and so on. The granularity may also be selectable within a particular embodiment. The selected granularity may depend on a variety of factors, such as the anticipated types of task processing, types of processor cores, performance trade-offs, and the like.

While the use of variable delays in the clock signals provided to the different processor cores can reduce the level of di/dt in the integrated circuit, this level can be reduced even further by making appropriate selections in the assignment of tasks and corresponding clock signals to particular processor cores. This is done in the present embodiment by assigning the tasks and clock signals so that successive clock signals (in order of the occurrence of their rising edges) are associated with non-adjacent processor cores.

This is beneficial because, as each processor core "fires" (i.e., as activity is triggered in the processor by the rising edge of the corresponding clock cycle,) the processor core draws energy from nearby decoupling capacitors. When a particular processor core fires, the nearby decoupling capacitors are no longer as fully charged as they were prior to the firing of the processor core. If an adjacent processor core is the next one to be fired, it tries to draw energy from these same decoupling capacitors, but since they are not fully charged, the energy must be drawn from elsewhere. This results in higher levels of di/dt. It is therefore beneficial, after the firing of the first processor core, to fire a processor core which does not draw as strongly from the depleted decoupling capacitors. This allows the decoupling capacitors depleted by the firing of the first processor core to recharge before a processor core adjacent to the first core is fired.

Figure 8:
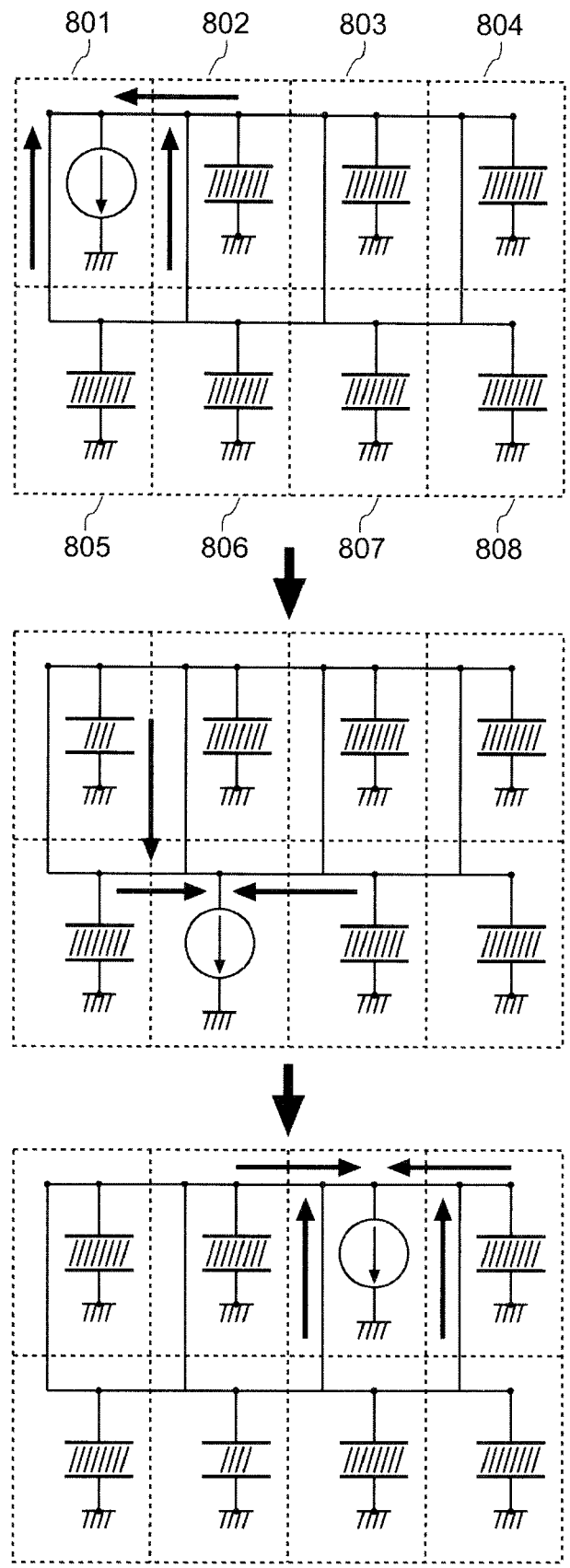
FIG. 8 is a diagram illustrating the successive firing of non-adjacent processor cores and the effect on nearby decoupling capacitors in accordance with one embodiment.

The successive firing of non-adjacent processor cores and the effect on nearby decoupling capacitors is illustrated in FIG. 8. In this figure, eight processor cores (810-808) are represented by boxes formed by the dotted lines. In this example, a decoupling capacitor corresponding to each processor core is shown. It should be understood that there need not be a single decoupling capacitor for each processor core—these are intended simply to represent the decoupling capacitors that are distributed throughout the integrated circuit.

In the example of FIG. 8, processor core 801 is fired first, as shown at the top of the figure. When the core is fired, current flows into the core as needed, driving the core's components. The arrows along the lines connecting the decoupling capacitors represents the current drawn by processor core 801 when it is fired. This current is primarily drawn from the decoupling capacitor nearest core 801 (not shown in the top portion of the figure,) and secondarily from other nearby capacitors, such as the ones corresponding to processor cores 802 and 805.

The middle portion of FIG. 8 shows that processor core 806 is fired next. Again, the current for this processor core is drawn primarily from the nearest decoupling capacitor (not shown in the middle portion of the figure) and secondarily from other nearby capacitors, such as those corresponding to processor cores 805 and 807. This sequence continues as shown in the bottom portion of FIG. 8 with the firing of processor core 803. In this example, the remaining processor cores will be fired in this order: 808; 805; 802; 807; 804. It can be seen in the bottom portion of the figure that, when processor core 803 is fired, the decoupling capacitor nearest processor core 801 has almost fully recharged, so that it will be available to provide some of the current required when processor cores 805 and 802 are fired.

Figure 9:
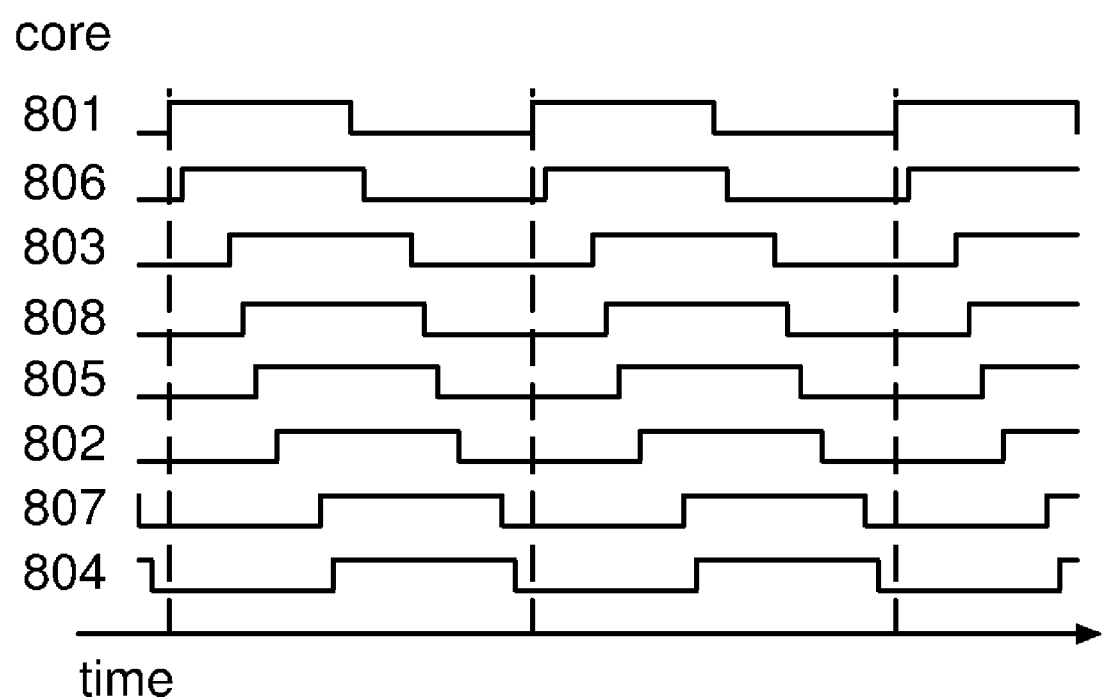
FIG. 9 is a timing diagram illustrating the firing order of processor cores illustrated in FIG. 8 in relation to the timing of the corresponding clock signals.

Referring to FIG. 9, the firing order of the processor cores illustrated in FIG. 8 is shown with respect to the timing of the corresponding clock signals. The clock signals are arranged according to the occurrence of their leading edges, with the earliest at the top of the figure and the latest at the bottom of the figure. At the left side of the figure are the reference numbers for the corresponding processor cores. Thus, it can be seen that processor core 801 uses the uppermost clock signal and is the first to fire during a clock cycle. Processor core 806 uses the next clock cycle, and so on, with core 804 using the lowermost, and latest firing, clock signal.

It should be noted that, the example of FIGS. 8 and 9 uses a particular arrangement of processor cores and firing order. Other embodiments may have different arrangements of processor cores (e.g., and different members of rows and/or columns) as well as different firing orders, while still maintaining an order in which non-adjacent processor cores are fired consecutively.

It should also be noted that, in embodiments which successively fire non-adjacent processor cores, the assignment of tasks to particular processor cores may be driven to some extent by the clock signal delays that are determined to be optimal for a particular set of tasks. For example, if it is determined that the optimal delays for a set of tasks A-D are such that the tasks should be executed in the order A, B, C, D (with appropriate delays,) then tasks A and B should not be assigned to adjacent processor cores. Likewise, tasks B and C, and tasks C and D, should not be assigned to adjacent processor cores. It may therefore be desirable to provide feedback from the delay management unit to the task management unit in order to allow the task management unit to assign the tasks to appropriate processor cores. Alternatively, this function may be delegated to the bus unit that conveys the tasks from the task management unit to the processor cores.

The foregoing description relates to a particular exemplary embodiment. It should be noted that many alternative embodiments are possible. These alternative embodiments may incorporate all, or only a portion of the features described above, and may have numerous variations of the above described structures, functions and features. Exemplary alternative embodiments may include, for instance, an embodiment in which the functions of the delay management unit are performed off-chip. In such an embodiment, the task management unit could provide task allocation information at an output port of the chip for use in determining the corresponding clock delays. The clock delay information could then be received at one or more input ports, from which the information could be provided to the variable delay elements in the timing system and to the bus unit and/or task management unit.

In another alternative embodiment, the processor cores may be replaced by other types of task processing units. These units may be simplified data processors, specialized logic circuits, or other types of circuitry that utilize clock signals to perform assigned tasks.

Those of skill in the art will understand that information and signals may be represented using any of a variety of different technologies and techniques. For example, data, instructions, commands, information, signals, bits, symbols, and the like that may be referenced throughout the above description may be represented by voltages, currents, electromagnetic, magnetic or optical fields, and so on.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with general purpose processors, digital signal processors (DSPs), application specific integrated circuits (ASICs), field programmable gate arrays (FPGAs) or other programmable logic devices, discrete gates or transistor logic, discrete hardware components, or any combination thereof designed to perform the functions described herein.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein and recited within the following claims.

What is claimed is:

1. A system comprising:
   two or more task processing units configured to perform assigned tasks;
   a timing system configured to provide each of the task processing units with a corresponding operating clock signal; and
   a delay management unit configured to manage delays of the timing system based on task information of the assigned tasks;
   wherein each task processing unit is configured to perform assigned tasks with timing defined by the corresponding operating clock signal; and
   wherein the timing system is configured to impart variable delays to one or more of the clock signals by shifting a phase of the clock signals.

2. The system of claim 1, wherein the timing system includes one or more variable delay elements, wherein each variable delay element is coupled to a corresponding one of the task processing units and is configured to delay a system clock signal by a variable amount to generate a corresponding one of the operating clock signals.

3. The system of claim 2, wherein each delay element is configured to enable selection of one of a set of discrete delays.

4. The system of claim 1, wherein the task processing units comprise processor cores in a multiprocessor system.

5. The system of claim 1, wherein the delay management unit is configured to receive task information associated with a set of tasks to be performed by the task processing units, to determine desired delays for each of the operating clock signals based on the task information, and to provide information identifying the desired delays to the timing system.

6. The system of claim 5, wherein the delay management unit is configured to determine desired delays for each of the operating clock signals by identifying an entry in a look-up table corresponding to the received task information, and retrieving the information identifying the desired delays from the look-up table.

7. The system of claim 1, wherein the timing system is configured to impart delays to the clock signals such that, when the clock signals are ordered according to the magnitudes of the corresponding delays, consecutive clock signals are provided to non-adjacent task processing units.

* * * * *